Aug. 8, 1944.       W. A. SCHULZE       2,355,563
ISOMERIZATION PROCESS
Filed Oct. 5, 1942
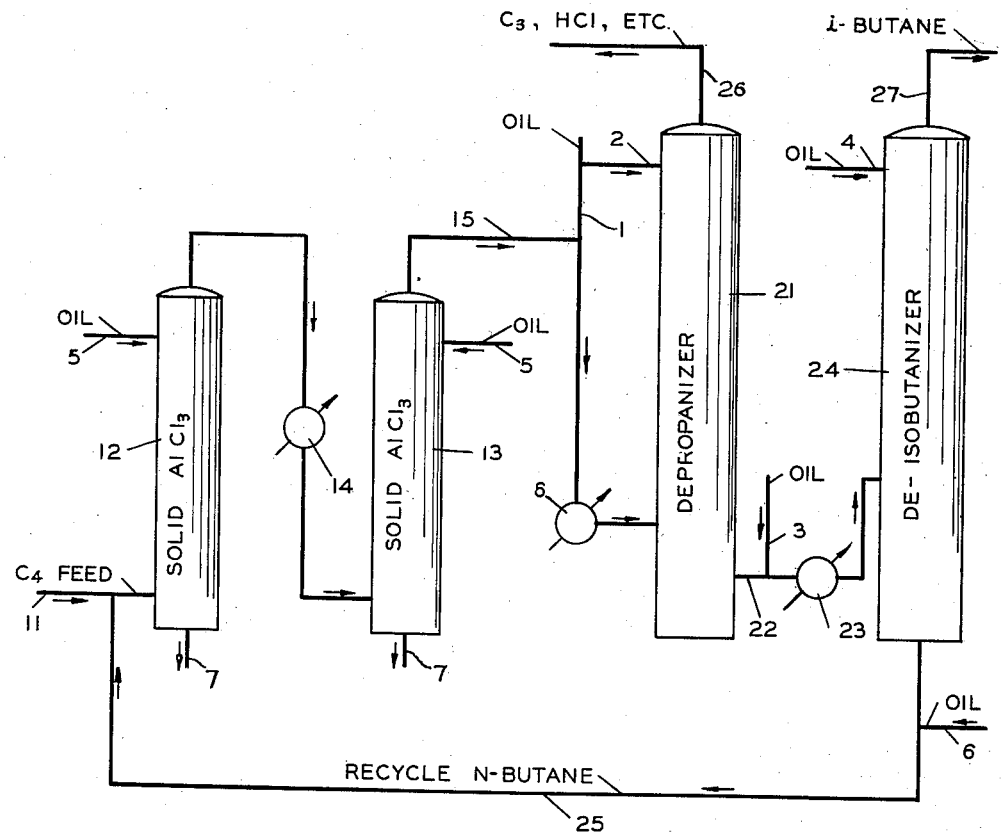
INVENTOR.
W. A. SCHULZE
BY Hudson, Young and Yinger
ATTORNEYS

UNITED STATES PATENT OFFICE 2,355,563

ISOMERIZATION PROCESS

Walter A. Schulze, Bartlesville, Okla., assignor to Phillips Petroleum Company, a corporation of Delaware Application October 5, 1942, Serial No. 460,850

7 Claims. (Cl. 260—683.4)

This invention relates to the isomerization of normal paraffins, especially normal butane to isobutane, over aluminum halides, especially aluminum chloride or other solid or semi-solid abrasive catalysts which attack conventional metal equipment by both erosion and corrosion. The operation of such processes, with hydrocarbons in either liquid or vapor phase, and with either a stationary or a fluid type catalyst is handicapped by the volatility of the aluminum halides such as aluminum chloride or bromide. Sublimed catalyst is often carried from the catalyst zone in the fluid hydrocarbon effluent and deposited in subsequent portions of plant equipment with rapid corrosion and/or erosion of liquid and vapor lines, heat exchangers, condensers, accumulators, fractionating columns, etc. Clogging of the equipment by the deposits causing increased flow resistance or stoppage of flow and reduced heat transfer is frequently also encountered.

In order to suppress the attack of the catalyst on metal equipment, in accordance with my invention, I inject sufficient of a high-boiling, non-aromatic, preferably essentially or entirely paraffinic, oil into the fluid stream at one or more points in the process in order to wet metal surfaces exposed to attack by the catalyst with a film of said oil and/or to remove deposits of catalyst and suppress further sublimation or mechanical entrainment resulting in carrying said catalyst into all portions of processing equipment.

The accompanying drawing portrays diagrammatically one arrangement of equipment which may be used for carrying out the invention, as applied to the isomerization of normal butane with aluminum chloride in the presence of HCl as a promoter.

The oil may be injected into the hydrocarbon feed entering the conversion unit, into the catalyst zone itself, into the recycle normal butane stream, into the several fractionating zones to reduce deposits on trays or clogging of packing as well as corrosion and erosion, into the feed entering heaters, coolers, condensers, etc. It may also be injected into the feed stream and/or the recycle catalyst slurry stream in a fluid catalyst type of conversion.

In the drawing, the normal butane-containing feed enters via line 11 whence it passes through catalyst towers 12 and 13 in series, cooler 14 being interposed therebetween to remove excess exothermic heat of reaction in the effluent from the first tower. The effluent from tower 13 passes via line 15 and cooler, condenser or heater 16 into the recovery system.

The recovery system comprises a depropanizer 21 from which the $C_3$ and lighter including hydrogen chloride is removed overhead via line 26. The bottoms pass via line 22 and heater 23 into fractionator 24 where isobutane and normal butane are separated, the former being withdrawn overhead via line 27 and the latter being recycled via line 25.

In accordance with the invention, the high-boiling oil is injected into the catalyst towers 12 and 13 via lines 5, into the vapor or liquid effluent line 15 ahead of heater 16 via line 1, into depropanizing column 21 via line 2, into line 22 ahead of heater 23 via line 3, into de-isobutanizing column 24 via line 4, and into normal butane recycle line 25 via line 6. The oil injected into towers 12 and 13 forms a film over the inside of the metal tower walls and collects in the bottom and is withdrawn via lines 7 together with the sludge draining from the catalyst beds. This film descends downwardly continuously over the inside surface of the catalyst towers, and is continuously reformed anew. The heavy oil also aids in sludge separation by rendering the sludge less viscous.

By proceeding in the foregoing manner, a heavy oil film on fluid passages where vaporization, corrosion or erosion take place and in vessels where catalyst sludge accumulates is provided so that the metal surfaces are protected. The non-aromatic oil is substantially non-reactive with the catalyst and, therefore, serves principally as a protective or dislodging vehicle without promoting formation of further sludge products. The catalyst deposits loosened or coagulated by the oil may be withdrawn from the system or returned for further use if in active state with regard to aluminum chloride content and physical characteristics. Also, since a high-boiling oil is employed, the quantity of light normally gaseous hydrocarbons dissolved therein is kept at a minimum and vaporization rates and temperatures will not be greatly affected. To this end, the amount of oil injected may be regulated to prevent deterioration of the solid catalyst and excessive absorption of the light hydrocarbons.

While the invention is particularly applicable to isomerization with aluminum bromide or chloride, especially the chloride in solid form, it may be applied in the case of other metal halide catalysts of the Friedel-Crafts type which give trouble with corrosion and/or erosion of metallic equipment. Examples of such other catalysts are normally solid or liquid chlorides, bromides and iodides of zirconium, tin, antimony, beryllium, zinc, titanium, boron, iron, etc.

While the invention has been described with especial reference to the isomerization of normal butane to isobutane, it may be applied to the isomerization of higher normal paraffins, e. g. pentane, hexane, etc. Also, it will be understood that it is applicable whether isomerization is done in vapor or liquid phase, whether the effluent is removed in vapor or liquid form and whether the catalyst is solid, dissolved or suspended.

I claim:

1. In a process for the isomerization of normal paraffins with a metal halide catalyst of the Friedel-Crafts type which causes corrosion and erosion of metallic equipment and wherein hydrocarbon mixtures containing said catalyst contact metallic equipment under conditions normally resulting in corrosion and erosion of such equipment, the improvement which comprises preventing said corrosion by wetting the surfaces of said equipment with a high-boiling non-aromatic essentially paraffinic oil.

2. In a process for the isomerization of normal paraffins with a metal halide catalyst of the Friedel-Crafts type which causes corrosion and erosion of metallic equipment and wherein hydrocarbon mixtures containing said catalyst contact metallic equipment under conditions normally resulting in corrosion and erosion of such equipment, the improvement which comprises maintaining a protective film of a high-boiling non-aromatic essentially paraffinic oil on the metallic surfaces of said equipment normally subject to attack.

3. In a process for the isomerization of normal paraffins with a metal halide catalyst of the Friedel-Crafts type which causes corrosion and erosion of metallic equipment and wherein hydrocarbon mixtures containing said catalyst contact metallic equipment under conditions normally resulting in corrosion and erosion of such equipment, the improvement which comprises injecting a high-boiling non-aromatic essentially paraffinic oil into the hydrocarbon mixture contacting the metallic surfaces normally subject to attack.

4. In a process for the isomerization of normal paraffins with a metal halide catalyst of the Friedel-Crafts type which causes corrosion and erosion of metallic equipment and wherein hydrocarbon mixtures containing said catalyst contact metallic equipment under conditions normally resulting in corrosion and erosion of such equipment, the improvement which comprises continuously forming a protective film of a high-boiling non-aromatic essentially paraffinic oil on the metallic surfaces of said equipment normally subject to attack, flowing said film along said surfaces, and withdrawing said oil after it has traversed said surfaces.

5. In the isomerization of normal butane to isobutane with aluminum chloride, in metallic equipment normally subject to deterioration by said chloride, the improvement which comprises wetting the surfaces of said equipment which normally are contacted by hydrocarbon and said chloride with a film of a high-boiling essentially paraffinic mineral oil.

6. In the isomerization of normal butane to isobutane with aluminum chloride wherein a mixture containing hydrocarbon and aluminum chloride passes through a vertical tower having metallic inner surfaces normally subject to corrosion and erosion by said mixture, the improvement which comprises continuously feeding a high-boiling non-aromatic essentially paraffinic oil adjacent the top of said tower and continuously forming a downwardly descending film of said oil on the inner surfaces of said tower and thereby protecting the surface thereof from corrosion and erosion by said mixture.

7. The process of claim 6 wherein said tower is a catalytic conversion unit containing a bed of solid aluminum chloride and wherein said film after reaching a point adjacent the bottom of said tower commingles with the aluminum chloride sludge accumulating therein and is withdrawn in admixture with said sludge.

WALTER A. SCHULZE.